United States Patent [19]

Johnson

[11] 4,282,828
[45] Aug. 11, 1981

[54] SHOWER VACCINATION APPARATUS

[75] Inventor: Keith A. Johnson, Bothell, Wash.

[73] Assignee: Tavolek, Inc., Redmond, Wash.

[21] Appl. No.: 128,989

[22] Filed: Mar. 10, 1980

[51] Int. Cl.³ .............................................. A01K 63/00
[52] U.S. Cl. ....................................................... 119/3
[58] Field of Search ............................ 119/3, 1, 2, 4, 5

[56] References Cited

U.S. PATENT DOCUMENTS

| 518,318 | 4/1894 | Hoxsie | 119/3 |
| 2,791,862 | 5/1957 | Shook | 119/3 X |
| 3,096,600 | 7/1963 | Gwyther | 119/3 X |
| 3,418,973 | 12/1968 | Saito | 119/3 |
| 3,734,058 | 5/1973 | Hightower et al. | 119/3 |

Primary Examiner—Hugh R. Chamblee
Attorney, Agent, or Firm—Donal B. Tobin

[57] ABSTRACT

A large, generally rectangular tank with an open top is divided into an inlet chamber and a shower chamber by an adjustable gate. The floor of the inlet chamber is grate raised above the floor of the tank so that the fish may be dewatered. The fish then flap themselves along the grate under the gate and into the shower chamber where they are subjected to a shower of vaccination solution introduced through shower nozzles supported across the top of the shower chamber. The floor of the shower chamber is solid and not a grate so that a quantity of vaccination solution stays on the floor of the shower chamber so that one is assured that both sides of the fish will be exposed to the vaccine solution. The floor of the shower chamber is also raised above the floor of the tank but stops short of the tank end wall so that the fish fall off onto the tank floor and are then flushed through an outlet into a holding pool. The open top of the inlet chamber and shower chamber are covered so that the temperature of the inlet chamber and the shower chamber can be controlled. The inlet chamber cover is slanted to channel fish toward the back of the inlet chamber so that they will stay on the grate a sufficient time to be dewatered and to spread out into a single layer as they flap toward gate 16. The tank is provided with vertically adjustable legs to provide an incline to the tank desired.

11 Claims, 6 Drawing Figures

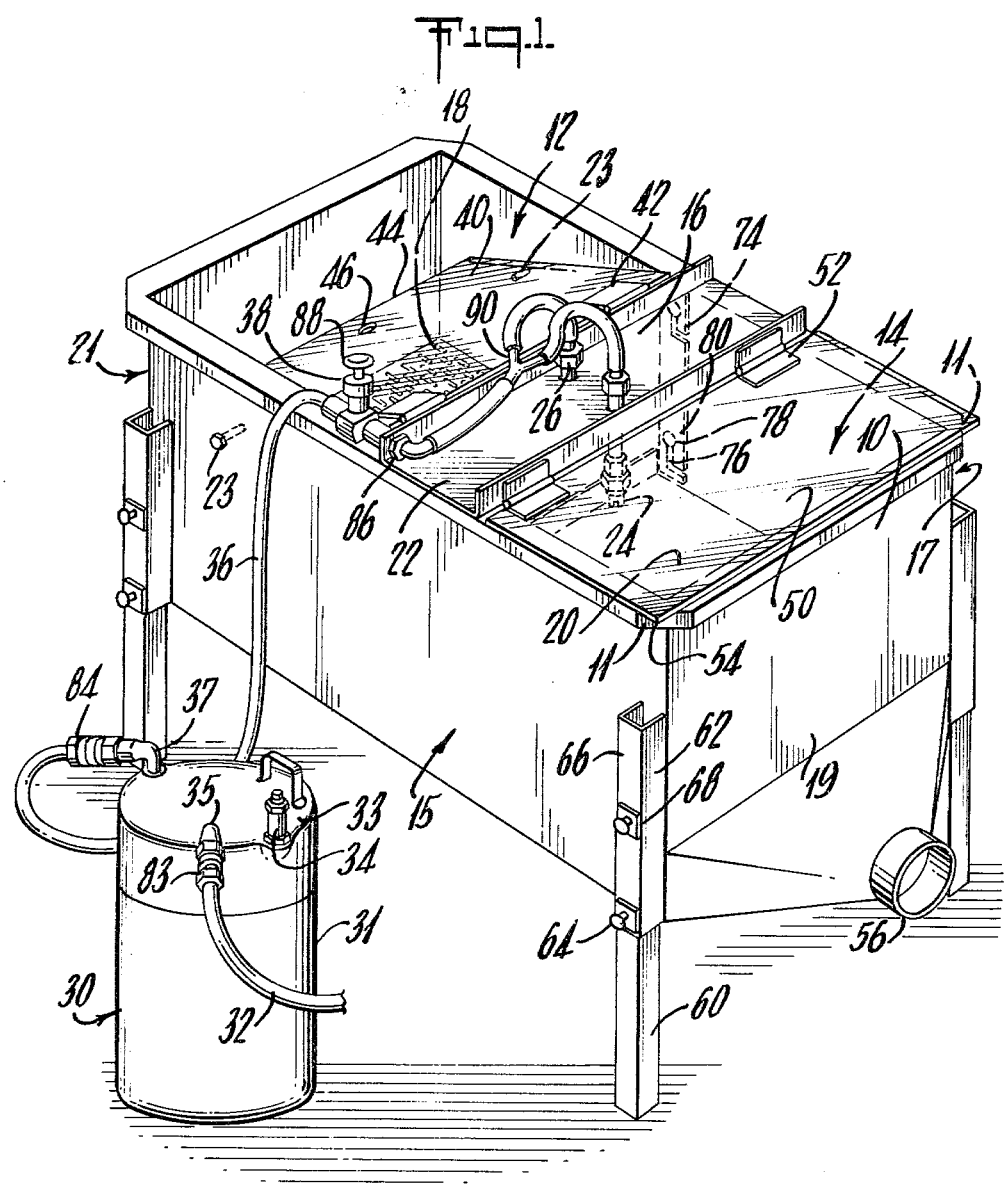

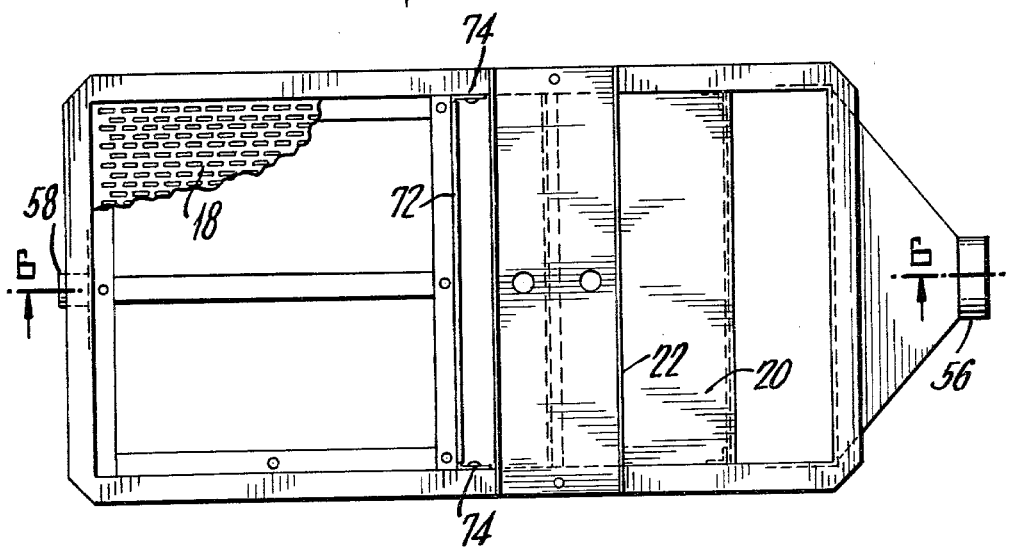
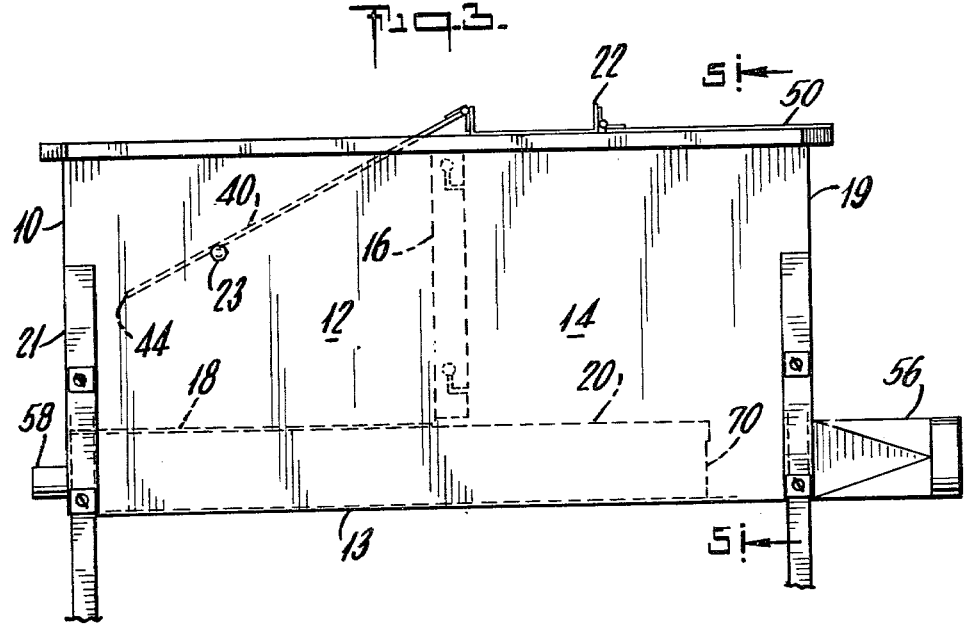

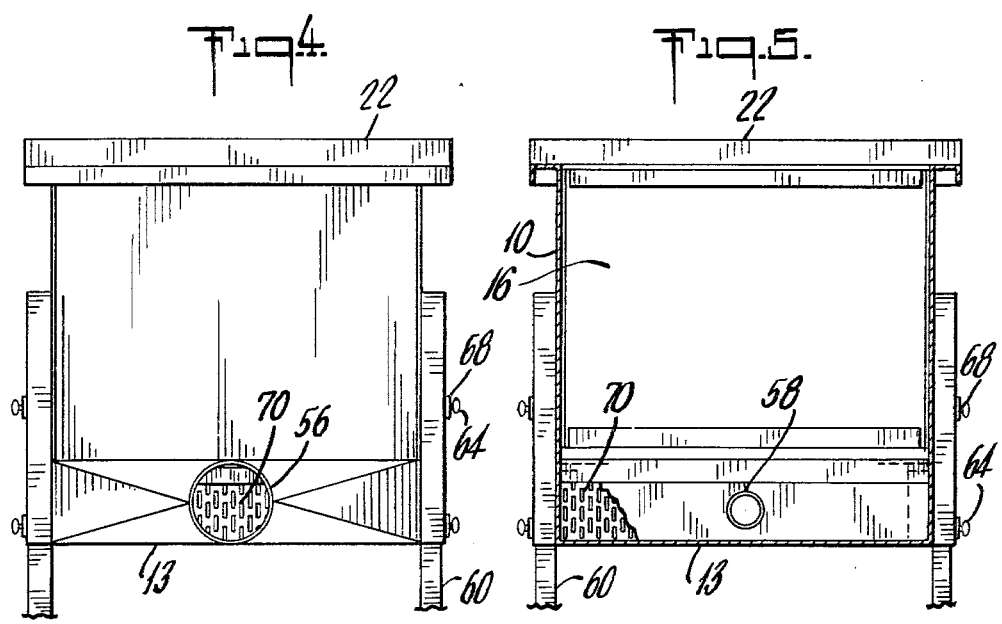
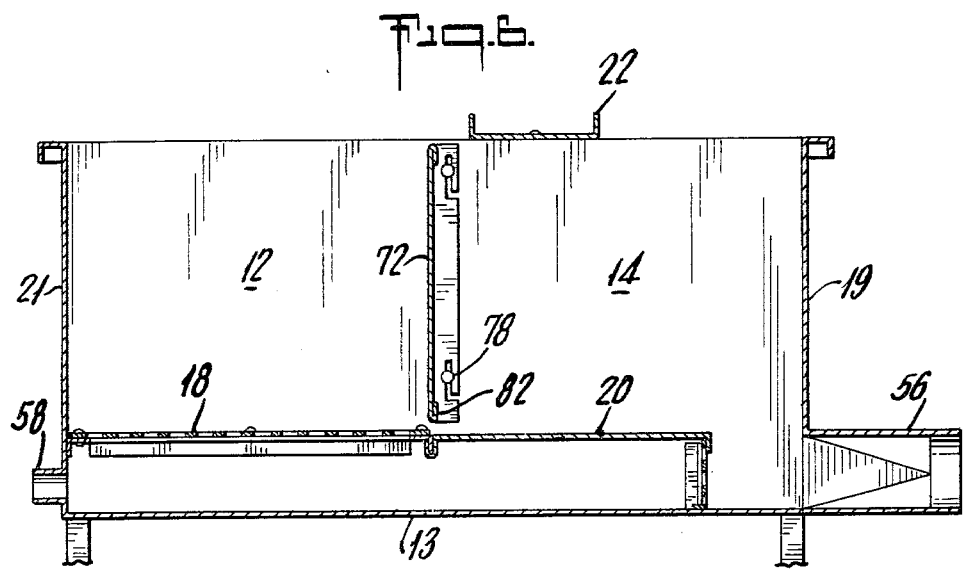

SHOWER VACCINATION APPARATUS

FIELD OF THE INVENTION

The present invention relates to an apparatus for immunizing fish and more particularly to an apparatus for immunizing fish by subjecting them to a shower of vaccination solution.

BACKGROUND OF THE INVENTION

It is generally recognized that increased production of cultured fish is necessary to meet the demand for high quality protein food in both the United States and the rest of the world. This results in high intensity culture of fish with its related problems of handling, diet, water quality and disease control. As density and growth rates are increased, disease problems increase and in many cases become the limiting factor on production. The concept of disease prevention, rather than attempted cure, has always been regarded as the most rewarding approach to control. It has been recognized that immunizing agents can be used as a complement to other methods of disease control. A problem exists in providing economic methods of mass vaccination. In the past, vaccines for fish have been delivered by several methods including parenteral injection; oral administration by incorporating the vaccine in the fish's diet; hyperosmotic inflitration by placing the fish in a hyperozmotic solution followed by a vaccine bath; direct immersion in vaccine suspension; or, by direct addition of vaccine to water in which fish are held. The report entitled "Spray Vaccination: A Method for the Immunization of Fish" by R. W. Gould and others, *Fish Pathology* XIII (1), 63–68, 1978.6, comments that each of these techniques has its inherent advantages and disadvantages. Although intraperitoneal injection appears to be most effective, this method is time consuming and stresses the fish being vaccinated. Oral administration is a desirble method of vaccine delivery, but in some cases has not provided high levels of resistance. Hyperosmotic infiltration and direct immersion may be useful in vaccinating small fish but may not be economical for larger fish. The *Fish Pathology* article further comments that the addition of vaccine to water has only had limited experimental use. The *Fish Pathology* article states that another method for mass immunization of fish is administration by spraying fish with antigens. The *Fish Pathology* article indicates that fish were spray vaccinated at pressures from 6.3 to 7.0 kg/cm$^2$ utilizing a commercial sandblasting gun with a venturi-feeding reservoir containing bacterin and explains that experimental groups of fish were placed in a dip net and sprayed five to ten seconds with the tip of the spray apparatus positioned 20 to 25 cm from the fish. The fish were moved in the net so that each received direct application of bacterin on some portion of the body surface. An atomizer was also used in a similar manner to spray vaccinate at zero pressure.

Improvement is needed in the apparatus used in spray immunizing fish. The present invention provides an apparatus which is particularly adapted to facilitate the mass immunization of fish using a low pressure shower.

SUMMARY OF THE INVENTION

The apparatus of the present invention enables the user to vaccinate larger fish of 10 to 45 grams at a cost which is comparable to or less than immunization of smaller fish by immersion methods. The present invention permits very large quantities of fish to be immunized in a short period with less stress to the fish and to the operators.

The present invention includes a large, generally rectangular tank with an open top which is divided into an inlet chamber and a shower chamber by an adjustable gate. The fish are picked up in a net and placed in the inlet chamber. The floor of the inlet chamber is a grate raised above the floor of the tank so that the fish may be dewatered. The fish then flap themselves along the grate under the gate and into the shower chamber where they are subjected to a shower of vaccination solution introduced through shower nozzles supported across the top of the shower chamber. The floor of the shower chamber is solid and not a grate so that a quantity of the vaccination solution stays on the floor of the shower chamber so that one is assured that both sides of the fish will be exposed to the shower solution. The floor of the vaccination chamber is also raised above the floor of the tank but stops short of the tank end wall so that the fish fall off onto the tank floor and are then flushed through an outlet into a holding pool. The water which falls through the dewatering grate of the inlet chamber is permitted to run along the floor of the tank to help flush the vaccinated fish through the outlet. Supplementary water may be added if desired to facilitate the flushing of the fish through the tank.

The vaccination solution is delivered to the shower nozzles from a pressurized tank which is pressurized by for example compressed air. A needle valve is used to adjust the flow rate of vaccination solution to the nozzles.

It may be desirable to provide an incline to the tank to assist the fish in traveling from the inlet chamber through the shower chamber and out through the outlet. Vertically adjustable legs are provided at the four courners of the tank to permit the tank to be inclined if desired.

The open tops of the inlet chamber and shower chamber are covered, preferably with plexiglass, so that the temperatures of the inlet chamber and shower chamber can be controlled so that the fish will be in proper condition for vaccination and so that the nozzles will not freeze. The inlet chamber cover is slanted to channel the fish toward the back of the inlet chamber so that they will stay on the grate a sufficient time to be dewatered before they pass under the grate into the shower chamber.

The present invention permits the vaccination of larger fish. In many cases, the larger fish can be immunized after death losses from other causes have occurred, thereby reducing the overall cost of vaccination by immunizing only the surviving fish. Because the range of the sizes of fish that can be vaccinated with the present invention is broader than with other techniques, vaccination can be more easily scheduled into the normal routine of hatchery operations.

By delaying vaccination until shortly before exposure, (introduction to net pens, ocean release, time of greatest anticipated exposure), maximum immunity can be provided during the period when it is most needed.

Substantially greater weights of fish can be vaccinated more rapidly and with less effort than by immersion.

BRIEF DESCRIPTION OF THE DRAWINGS

These and other features of the present invention will be more fully understood from the following detailed description taken in conjunction with the accompanying drawings in which:

FIG. 1 is a perspective view of the apparatus of the present invention;

FIG. 2 shows a plan view of the apparatus of FIG. 1;

FIG. 3 shows a side elevation view of the apparatus of FIG. 1;

FIG. 4 shows a front elevation view of the apparatus of FIG. 1;

FIG. 5 shows a sectional elevation view taken along line 5—5 in FIG. 3; and,

FIG. 6 shows a sectional elevation view taken along line 6—6 in FIG. 2.

DETAILED DESCRIPTION OF THE PREFERRED EMBODIMENTS

Referring now to FIG. 1, there is shown a generally rectangular tank 10 divided into an input chamber 12 and a shower chamber 14 by a gate 16 extending transversely across tank 10. The bottom of input chamber 12 has a grate 18 raised above the floor 13 (see FIG. 3) of tank 10 to permit water which may be placed into the input chamber 12 with the fish to run off the fish onto the floor of the tank. The floor 20 of the shower chamber is a solid piece.

The shower apparatus is made primarily of sheet metal. Tank 10 is formed principally of three pieces, the first piece being a U-shaped channel forming side wall and floor 13. Two generally rectangular end walls 19 and 21 are placed at either end of the channel to form tank 10 into an enclosure.

Extending across the open top of shower chamber 14 is a channel piece 22 which provides structural support for shower nozzles 24 and 26. A vaccination solution is provided to nozzles 24 and 26 from a compression tank 30 which is pressurized to the desired level by compressed air entering through compression tank inlet hose 32. A safety valve 34 is provided on top of compression tank 30. Vaccine solution is delivered to nozzles 24 and 26 through delivery hose 36. A needle valve 38 is provided in the delivery hose line 36 between compression tank 30 and nozzles 24 and 26 to permit the metering of the vaccine solution delivered to nozzles 24 and 26.

The input chamber is provided with a plexiglass cover 40 which is connected by hinges 42 to channel 22 and extends at an angle over the open top of inlet chamber 12 and held above grate 18 by pins 23 extending through side wall 15 and 17. The end 44 of cover 40 is spaced a small distance away from the end wall 21 of inlet chamber 12 so that the fish may be placed on top of the cover and allowed to slide into the inlet chamber through the space. This channels the fish to the rear of inlet chamber 12 so that they will stay on grate 18 a sufficient time to be dewatered before they pass under gate 16 to shower chamber 14. Channelling the fish in this way to the rear of inlet chamber 12 permits them to spread out into a single layer as they flap toward gate 16 and do not pile up around the gate. A handle 46 is provided on cover 40 so that it may be easily lifted. When cover 40 is lifted end 44 will clear end wall 21 of inlet chamber 12. Cover 40 keeps the temperature in the inlet chamber within desired limits as will be explained subsequently in the application.

The shower chamber 14 is also provided with a plexiglass cover 50 which is supported by hinges 52 from channel 22 and rests over the edge of the top of tank 10. Cover 50 is provided to maintain the temperature in the shower chamber 14 at the desired level for the fish and to prevent the nozzles from freezing. Corners 11 of the upper periphery of tank 10 are chamfered so that the edge 54 of plexiglass top 50 extends slightly beyond the upper periphery of tank 10 to provide a slight overhang to facilitate the lifting of cover 50.

A large volume of fish may be scopped up in a net from a holding pool (not shown) and placed in inlet chamber 12 on grate 18. Water which may be introduced into inlet chamber 12, along with the fish, drips down through grate 18 onto floor 13 of tank 10. The fish then flap along grate 18 under gate 16 and into shower chamber 14 where they are showered with a vaccine solution delivered through nozzles 24 and 26.

As shown particularly in FIG. 3, the floor of shower chamber 14 stops short of end wall 19 of tank 10. The fish fall from the floor 20 of shower chamber 14 to floor 13 of tank 10 and then swim through outlet 56 into a holding tank (not shown). The water which has dripped through grate 18 collects on floor 13 of tank 10 and provides a medium to flush the fish out of tank 10. Still referring to FIG. 3, there is shown an inlet 58 for a supplementary water supply to provide additional water in the bottom of tank 10 to facilitate flushing the vaccinated fish through outlet 56.

Referring again to FIG. 1, it can be seen that outlet 56 is a tapered duct having a generally rectangular inlet having a width generally coextensive with the width of tank 10 and a height about equal to the height of floor 20 of shower chamber 14 above the floor 13 of tank 10. The outlet orifice 56 is generally circular and has a diameter about equal to the height of shower chamber floor 20 above tank floor 13.

Adjustable legs 60 are provided at the four corners of tank 10. Channel pieces 62 are welded at the corners of tank 10 with the open side of the channel facing the wall of tank 10. Each channel is provided with two thumb set screws projecting through the solid base 66 of channel 62 into the enclosure defined by the walls of channel 62 and tank 10. Thumb set screw support pieces 68 may be welded to solid face 66 of channel 62 to provide additional support for thumb set screws 64. Legs 60 which are generally rectangular tubular members slide into the space defined by the walls of channel 62 and tank 10 and are held in place by tightening thumb set screws 64. The level of the tank can be easily adjusted by adjusting the height of legs 60. It is desirable for the legs to be adjustable so that the tank may be inclined from inlet chamber 12 toward shower chamber 14 to make it easier for the fish to flap themselves along grate 18 and floor 20 from inlet chamber 12 to shower chamber 14. It has been found that small fish need a significant incline, preferably about five to ten degrees, to assist their travel through the apparatus, whereas larger fish are strong enough to travel from one chamber to the other with less incline.

Referring now to FIGS. 1 and 3, it can be seen that floor grate 18 of inlet chamber 12 and floor 20 of shower chamber 14 are raised above the floor 13 of tank 10. Grate 18 and floor 20 may be raised to same distance above tank floor 13 to define a substantially continuous floor for inlet chamber 12 and shower chamber 14, or floor 20 may be closer to tank floor 13 to provide a step from inlet chamber 12 to shower chamber 14 if desired.

This space is provided to permit water, which may be placed in inlet chamber 12 along with the fish, to run off the fish so that the fish are substantially dewatered in inlet chamber 12. The floor 20 of shower chamber 14 does not extend all the way to the end of end wall 19 of tank 10 but stops short of tank 10 so that after the fish have received the vaccination shower, they fall from floor 20 toward floor 13 of tank 10 and are flushed through outlet 56 by the flow of water on the bottom of tank 10. As discussed above, supplementary water may be supplied through inlet 58 to provide a sufficient flow for flushing the fish or for permitting them to swim into a holding tank. As can be seen in FIG. 4, floor 20 is vertically supported by a second grate 70 which extends substantially vertically from floor 13 of tank 10 to floor 20 of shower chamber 14. The holes in grate 70 permit the water flowing in the bottom of tank 10 to flow through grate 70 toward outlet 56 and to carry the vaccinated fish along with the flow. Grate 70 prevents the fish from traveling under floor 20 and/or grate 18.

As will be explained subsequently, it is important to control the speed at which fish pass through the apparatus. It is also desirable to have them pass through in one layer and not to have fish laying on top of one another so that each fish will receive the maximum exposure to the vaccination shower. The rate at which fish pass through the apparatus is partially controlled by gate 16 which separates inlet chamber 12 from shower chamber 14. Gate 16 has a partition wall 72 extending transversely across tank 10 and separating chamber 12 from chamber 14. Partition 72 has two flanges 74 extending perpendicularly to the face of partition 72 along its vertical edges and facing side walls 15 and 17 of tank 10. Each flange 74 has two L-shaped slots 76 with its shorter leg extending from the free edge of flange 74 toward the surface of partition 72 and with their longer leg extending parallel to the surface of partition 72. Bolts 78 extend through the longer leg of L-shaped slot 76 and through the side wall of tank 10. Each bolt has a washer 80 associated with it to provide a bearing surface for holding flange 74 in position when the bolt is tightened. The L-shaped slots 76 permit the height of gate 16 above the surface defined by grate 18 and floor 20 to be adjusted to regulate the flow of fish from inlet chamber 12 to shower chamber 14. The bottom of gate 16 includes a flap 82 which is curled up against the portion of partition 72 facing into shower chamber 14 so that the fish are not exposed to any sharp edges which could injure the fish. The clearance distance between the bottom of gate 16 and the surface formed by grate 18 and floor 20 is an important feature in determining the rate at which fish pass through the apparatus. It is desirable that fish take from two to five seconds to pass through the shower chamber 14. The speed at which they pass through the shower chamber 14 can be controlled by the height of gate 16, the incline of tank 11 and the rate at which fish are placed into inlet chamber 12. It is desirable to tilt the box slightly, preferably about five to ten degrees from back wall 21 of inlet chamber 12 to front wall 19 of shower chamber 14. It is also important that the gate be adjusted so that fish pass through shower chamber 14 in a single layer and are contacted by the shower for two to five seconds. Channelling the fish into inlet chamber 12 by using slanted cover 40 helps spread the fish out along grate 18 so that they will not pile up against gate 16.

Referring now to FIG. 1, the system for delivering the vaccination solution to shower chamber 14 will be discussed. Compression tank 30 is a conventional pressure vessel including a receptacle portion 31 which is a generally cylindrical vessel open at the top and threaded around its upper periphery to receive cooperating threads on cap portion 33. Compression tank 30 is preferably made of stainless steel to provide a clean medium for holding the vaccination solution. A conventional sealing means is provided between receptacle 31 and cap portion 33. A safety valve 34 is mounted through cap 33 to permit excess pressure to be vented from tank 30. Safety valve 34 may be a conventional spring-biased check valve. Cap 33 includes two additional fittings 35 and 37 respectively for permitting compressed air to be introduced to tank 30 through compressed air hose 32 and vaccination solution to be removed from tank 30 through delivery hose 36. A shut off valve 82 is included between compressed air hose 32 and fitting 35. If the pressure in compressed air hose 32 gets too high, a similar shut off valve 84 is provided in delivery tube 36 to shut off the flow of vaccination solution to nozzles 24 and 24.

A needle valve 38 is provided in delivery line 36 between shut off valve 84 and nozzles 24 and 26 to permit the flow of vaccination solution to be regulated. Needle valve 38 is a conventional needle vavle supported of channel 22 by means of fitting 86. The flow may be adjusted by turning handle 88 of needle valve 38 clockwise to reduce the flow or counterclockwise to increase the flow. Downstream of needle valve 38, delivery line 36 includes a y-connection 90, one arm of which goes to each of nozzles 24 and 26.

The two shower nozzles 24 and 26 are aligned axially in the direction in which the fish pass through the shower chamber 14 to assure that all of the fish are properly sprayed. Each shower nozzle provides a flared spray which extends generally transversely across the entire shower chamber in a curtain. Using two shower nozzles 24 and 26 provides two curtains of vaccination solution through which the fish must pass. Thus, one is assured of spraying each fish thoroughly.

In operation, compression tank 30 is charged with the desired vaccination solution and pressurized by introducing compressed air through compressed air tube 32. Needle valve 38 is adjusted to provide the desired flow rate through shower nozzles 24 and 26. The height of gate 16 is adjusted to let the fish pass at the desired rate and in a single layer. Legs 60 for tank 10 are adjusted by using thumb set screws 64 to provide a greater or lesser incline to the surface formed by grate 18 and floor 20 to assist the fish in passing from inlet chamber 12 to shower chamber 14. It has been discovered that smaller fish need more assistance in traveling through the apparatus so that when the apparatus is used to vaccinate small fish, the incline will be greater. Larger fish need less help so the incline will be correspondingly less. Covers 40 and 50 are closed so that the temperature in inlet chamber 12 and shower chamber 14, respectively, may be properly maintained so that the fish will be in proper condition to receive the vaccine and so that the shower nozzles will not freeze.

Desired amounts of antigen may be diluted with hatchery water. It has been found preferable to use a 22.7 liter (6 gallon) stainless steel pressure tank. The vaccine has been HIVAX* *Vibrio anguillarum* Bacterin or REMOVAX* Enteric Redmouth Bacterin which has been diluted at the rate of 1 liter of bacterin to 9 liters of hatchery water. Using a 22.7 liter tank permits two liters of bacterin to be diluted with 18 liters of hatchery water without exceeding the capacity of the tank. Care must be taken to insure that the water used to dilute the bacterin must be free of particulate matter or filtered to prevent clogging of the shower nozzles. The present invention provides nozzles which are removable for cleaning should they become clogged.
*Trademark It has been found preferable to apply 30 lbs. per square inch of pressure to compression tank 30. At this pressure, each liter of undiluted bacterin (10 liters of vaccine solution) will provide 13 minutes of continuous vaccination if the nozzles are clean. If the vaccination time is longer than 13 minutes per liter of bacterin, the operator must check the operating pressure or check the shower nozzles for partial occlusion.

The present invention is designed to deliver the proper amount of HIVAX* Bacterin or REMOVAX* Bacterin Vaccine at 30 lbs. pressure with a calibrated nozzle supplied when fish are passing through shower chamber 14 in two to five seconds.

Fish are then scopped up in a net and placed in inlet chamber 12. The fish slide along the incline surface of cover 40 through the space between edge 44 of cover 40 and back wall 21 of inlet chamber 12 onto grate 18. The fish slide from cover 40 onto grate 18 near back wall 21 of inlet chamber 12, a few at a time. Channelling the fish into chamber 12 permits them to stay on grate 18 a sufficient time to be dewatered and to spread out into a single layer before passing under gate 16 into shower chamber 14 so that they tend not to pile up around gate 16. Any water which is netted in with the fish will fall through grate 18 onto floor 13 of tank 10 and flow toward outlet 56. The fish are dewatered on grate 18 so that the surface of the fish is in condition to receive the vaccine when the fish reach shower chamber 14. Fish flap themselves along grate 18 under gate 16 onto floor 20 of shower chamber 14 where they are exposed to the spray for a period of time, preferably two to five seconds.

The fish then fall from floor 20 of shower chamber 14 toward floor 13 of tank 10 where they are flushed through outlet 56 into a holding tank (not shown). If there is insufficient water on floor 13 for tank 10 to flush the fish through outlet 56, supplementary water may be added to the tank 11 through input 58 so that a flow of water may be created along the floor 13 of tank 10 to flush the fish through outlet 56 or to provide a substantial quantity of water on the floor of tank 11 so that the fish may swim through outlet 56. Floor 20 is supported by a grated wall 70 extending transversely across shower chamber 14 to permit the flow of supplementary water and water dewatered from the fish on grate 18 to flow through tank 10 but at the same time to prevent fish from travelling in the wrong direction under floor 20 of shower chamber 14. It will be noted that floor 20 of shower chamber 14 is a solid piece without grating holes so that a quantity of the vaccination medium will stay on the floor 20 and flow off with the fish. In this way, one is assured of treating both sides of the fish with the vaccintion medium.

The shower vaccination apparatus of the present invention was used to vaccinate different kinds of fish using different kinds of vaccination solution. Summaries of the data on five such tests, using five different fish and two different vaccination solutions, are summarized in the following table:

TABLE I

| | | Size | Lbs/ Minute | Fish/ Minute | Lbs/ Liter | Fish/ Liter |
|---|---|---|---|---|---|---|
| | REMOVAX* Enteric Redmouth Bacterin | | | | | |
| 1. | Blue Lakes | 41/lb (11g) | 36.6 | 1,501 | 476 | 19,516 |
| 2. | Valley Trout | 27/lb (17g) | 50.0 | 1,350 | 650 | 17,550 |
| 3. | Clear Springs | 24/lb (19g) | 38.5 | 924 | 501 | 12,024 |
| | HIVAX* Vibrio Anguillarum Bacterin | | | | | |
| 4. | Apex | 15/lb (30g) | 53 | 795 | 689 | 10,335 |
| 5. | Domsea | 15/lb (30g) | 53 | 795 | 689 | 10,335 |

*Trademark

While the invention has been illustrated in certain embodiment, it is recognized that variations and changes may be made therein without departing from the invention. It is, therefore, not intended to limit the invention except as set forth in the following claims.

What is claimed is:

1. An apparatus for vaccinating fish comprising:
- a tank having first and second side walls, front and rear end walls and a floor;
- a gate extending across said tank from said first side wall to said second side wall and separating said tank into an inlet chamber for receiving a quantity of fish to be vaccinated and a shower chamber where vaccine may be administered to the fish;
- a dewatering grate disposed in said inlet chamber and defining a bottom therefor generally coextensive with said tank floor of said inlet chamber and raised thereabove to provide a space into which water which may be introduced into said inlet chamber with the fish can run off;
- a floor disposed in said shower chamber extending across said shower chamber from one tank side wall to the other and extending from said grate part way to said front end wall and raised above said tank floor;
- said front end wall including a discharge opening for the fish;
- means for adjusting the distance between the bottom of said gate and the surface defined by said grate to control the rate at which fish pass from said inlet chamber to said shower chamber.

2. The apparatus of claim 1 further including means on said tank for adjusing the incline of the surface defined by said grate.

3. The apparatus of claim 1 further including means for introducing supplementary water to the space beneath said grate and said shower chamber floor to facilitate the removal of vaccinated fish.

4. The apparatus of claim 1 further including a grate wall extending from the floor of said tank to the edge of said shower chamber floor adjacent said front end wall of said tank for preventing the vaccinated fish from traveling under said shower chamber floor but permitting the passage of water from said dewatering grate to said discharge opening.

5. The apparatus of claim 1 further including a cover for said inlet chamber inclined at an angle to said grate, spaced apart from said grate and from said tank rear end wall to provide a channel for delivering said fish to the portion of said grate adjacent said tank rear end wall.

6. The apparatus of claim 1 further including a cover for said shower chamber substantially enclosing the top thereof to maintain the proper environment therewithin.

7. The apparatus of claim 1 wherein said grate and said shower chamber floor are raised the same distance above said tank floor to define a substantially continuous floor for said inlet chamber and said shower chamber.

8. The apparatus of claim 1 further including shower nozzles adapted to deliver a shower of vaccination solution to said shower chamber.

9. The apparatus of claim 8 further including means in fluid communication with said shower nozzles for delivering vaccination solution thereto including:
   a compression tank adapted to contain a quantity of vaccination solution under pressure;
   flow regulating means in fluid communication between said compression tank and said nozzles for regulating the amount of vaccination solution delivered to said nozzles.

10. The apparatus of claim 8 wherein each of said shower nozzles include means for directing said shower into a curtain extending transversely of said shower chamber from one side wall to the other.

11. The apparatus of claim 8 wherein said shower chamber floor includes a solid portion adapted to permit a quantity of said vaccination solution to build up thereon and contact the surface of the fish as they pass through said shower chamber.

* * * * *